United States Patent
Noro et al.

(10) Patent No.: US 11,105,895 B2
(45) Date of Patent: Aug. 31, 2021

(54) AXIAL MISALIGNMENT DETERMINATION METHOD OF OBJECT DETECTION SENSOR

(71) Applicant: DENSO CORPORATION, Kariya (JP)

(72) Inventors: Satoru Noro, Kariya (JP); Hiroyuki Kani, Kariya (JP); Hideki Otsuka, Kariya (JP); Mitsuyasu Matsuura, Nisshin (JP)

(73) Assignee: DENSO CORPORATION, Kariya (JP)

( * ) Notice: Subject to any disclaimer, the term of this patent is extended or adjusted under 35 U.S.C. 154(b) by 172 days.

(21) Appl. No.: 16/338,809

(22) PCT Filed: Sep. 22, 2017

(86) PCT No.: PCT/JP2017/034335
§ 371 (c)(1),
(2) Date: Apr. 2, 2019

(87) PCT Pub. No.: WO2018/066391
PCT Pub. Date: Apr. 12, 2018

(65) Prior Publication Data
US 2020/0011969 A1 Jan. 9, 2020

(30) Foreign Application Priority Data
Oct. 4, 2016 (JP) .............................. JP2016-196692

(51) Int. Cl.
*G01S 7/40* (2006.01)
*G01B 21/24* (2006.01)
(Continued)

(52) U.S. Cl.
CPC ................ *G01S 7/40* (2013.01); *G01B 21/24* (2013.01); *G01S 7/521* (2013.01); *G01S 13/86* (2013.01)

(58) Field of Classification Search
CPC ........................................................ G01S 7/40
See application file for complete search history.

(56) References Cited

U.S. PATENT DOCUMENTS

| 2008/0201033 A1 | 8/2008 | DeMersseman et al. |
| 2013/0297173 A1 | 11/2013 | Takagi et al. |

FOREIGN PATENT DOCUMENTS

| JP | 2008-209242 A | 9/2008 |
| JP | 2010-519545 A | 6/2010 |

(Continued)

OTHER PUBLICATIONS

JP2008209242 (Okada Takashi), machine translation (Year: 2008).*

*Primary Examiner* — Anne Marie Antonucci
*Assistant Examiner* — Abdalla A Khaled
(74) *Attorney, Agent, or Firm* — Maschoff Brennan

(57) ABSTRACT

A sensor unit including an object detection sensor and an inclination sensor is mounted to a vehicle, and axial misalignment of the object detection sensor is determined as follows. A first inclination angle acquiring step of disposing the sensor unit, so that a first predetermined direction is aligned with a second predetermined direction before the sensor unit is mounted to the vehicle, and acquiring a first inclination angle detected by the inclination sensor from the inclination sensor, is performed. Then, a second inclination angle acquiring step of mounting the sensor unit on the vehicle and acquiring a second inclination angle detected by the inclination sensor from the inclination sensor, is performed. Finally, an axial misalignment determining step of determining whether axial misalignment has occurred at the object detection sensor, based on the first inclination angle and the second inclination angle, is performed.

7 Claims, 3 Drawing Sheets

(51) Int. Cl.
    *G01S 7/521*     (2006.01)
    *G01S 13/86*    (2006.01)

(56) References Cited

FOREIGN PATENT DOCUMENTS

| JP | 2012-144162 A1 | 8/2012 |
| JP | 2016-149711 A  | 8/2016 |

* cited by examiner

AXIAL MISALIGNMENT DETERMINATION METHOD OF OBJECT DETECTION SENSOR

CROSS REFERENCE TO RELATED APPLICATION

The present application is a national stage application of PCT Application No. PCT/JP2017/034335, filed on Sep. 22, 2017, which claims priority to Japanese Patent Application No. 2016-196692, filed Oct. 4, 2016, the description of which is incorporated herein by reference. Also, any applications for which a foreign or domestic priority claim is identified in the Application Data Sheet as filed with the present application are hereby incorporated by reference under 37 CFR 1.57.

TECHNICAL FIELD

The present disclosure relates to an axial misalignment determination technique of an object detection sensor.

BACKGROUND ART

Travelling support apparatuses which are mounted to vehicles, and detect an object existing ahead or behind the vehicle, and command an alarm to be issued, or command automatic braking, are known. In this kind of the traveling support apparatus, an object ahead or behind the vehicle is detected, based on reflected waves of a laser, millimeter waves, or the like, which is radiated by a radar as transmission waves and reflected by the object, or based on image data captured by an imaging apparatus. For example, PTL 1 discloses a traveling support apparatus including a sonar which detects an obstacle existing on a movement trajectory of a vehicle upon backward movement of the vehicle using ultrasonic waves, and a radar which detects an obstacle existing on a movement trajectory of the vehicle upon forward movement of the vehicle using radio waves.

CITATION LIST

Patent Literature

[PTL 1] JP 2012-144162 A

SUMMARY OF THE INVENTION

If an object detection sensor such as a sonar, a radar, and a camera, which detects an external object is mounted to the vehicle, so-called axial misalignment may occur, in which an object detection direction of the object detection direction sensor may be misaligned in a horizontal direction or in a vertical direction with respect to a predetermined direction. If the external object is detected by the object detection sensor which is axially misaligned, there may occur an error in a detection position of the object by an amount corresponding to the axial misalignment.

The present disclosure has been made to solve the above-described problem, and is mainly directed to providing an axial misalignment determination method of an object detection sensor which is capable of determining that axial misalignment has occurred occurs at the object detection sensor, with high accuracy, when the object detection sensor is mounted to a vehicle.

The present disclosure is an axial misalignment determination method for determining axial misalignment of an object detection sensor using a sensor unit including the object detection sensor in which a first predetermined direction is set as an object detection direction, and an inclination sensor which detects an inclination angle as inclination with respect to a second predetermined direction, being mounted to a vehicle, the axial misalignment determination method including a first inclination angle acquiring step of disposing the sensor unit so that the first predetermined direction is aligned with the second predetermined direction before the sensor unit is mounted to the vehicle and acquiring a first inclination angle from the inclination sensor as the inclination angle detected by the inclination sensor, a second inclination angle acquiring step of mounting the sensor unit on the vehicle and acquiring a second inclination angle from the inclination sensor as the inclination angle detected by the inclination sensor, and an axial misalignment determining step of determining whether axial misalignment has occurred at the object detection sensor based on the first inclination angle acquired in the first inclination angle acquiring step and the second inclination angle acquired in the second inclination angle acquiring step.

By misalignment occurring in a mounting angle of the sensor unit when the sensor unit including the object detection sensor is mounted to the vehicle, so-called axial misalignment may occur at the object detection sensor, in which detection direction of the object detection sensor is inclined in a horizontal direction or in a vertical direction with respect to a direction determined in advance. If an object is detected with the object detection sensor which is axially misaligned, there is a possibility that an error may occur in a detection position of the object by an amount corresponding to the axial misalignment.

As a countermeasure, the sensor unit including the object detection sensor further includes an inclination sensor which detects an inclination angle, that is inclination with respect to the second predetermined direction. Based on the second inclination angle detected by this inclination sensor, it is determined whether axial misalignment has occurred at the object detection sensor.

However, when the inclination sensor is attached to the sensor unit, there may be a case in which the inclination sensor is attached at a position displaced from a position where the inclination sensor should be originally attached. In that case, some error in positional relationship may occur between the object detection sensor and the inclination sensor within the sensor unit. Even if the second inclination angle is detected by the inclination sensor, and even if it is determined whether axial misalignment of the object detection sensor occurs based on the detected second inclination angle in this state, because the error in the positional relationship between the object detection sensor and the inclination sensor within the sensor unit is not taken into account, axial misalignment may not be determined with high accuracy.

Therefore, before the sensor unit is mounted to the vehicle, the sensor unit is disposed so that the first predetermined direction which is a detection direction of the object detection sensor is aligned with the second predetermined direction, and the first inclination angle which is detected by the inclination sensor in this state is acquired. Thus, it is possible to obtain a degree of inclination of the inclination sensor with respect to the second predetermined direction, based on a state where the detection direction of the object detection sensor is aligned with the second predetermined direction. That is, it is possible to detect the inclination of the inclination sensor with respect to the detection direction of the object detection sensor. Thereafter, the sensor unit is mounted to the vehicle, and the second inclination angle detected by the inclination sensor at that time is acquired. The second inclination angle acquired at that time is the inclination of the inclination sensor with respect to the second predetermined direction if the sensor unit is mounted to the vehicle. Therefore, by axial misalignment of the object detection sensor being determined based on the first inclination angle as well as the second inclination angle in the axial misalignment determining step, it is possible to determine axial misalignment of the object detection sensor with high accuracy.

BRIEF DESCRIPTION OF DRAWINGS

Referring to the accompanying drawings, specific description will be provided below to clarify the above object and other objects, characteristics and advantageous effects of the present disclosure. The drawings are.

DESCRIPTION OF EMBODIMENT

Figure 1:
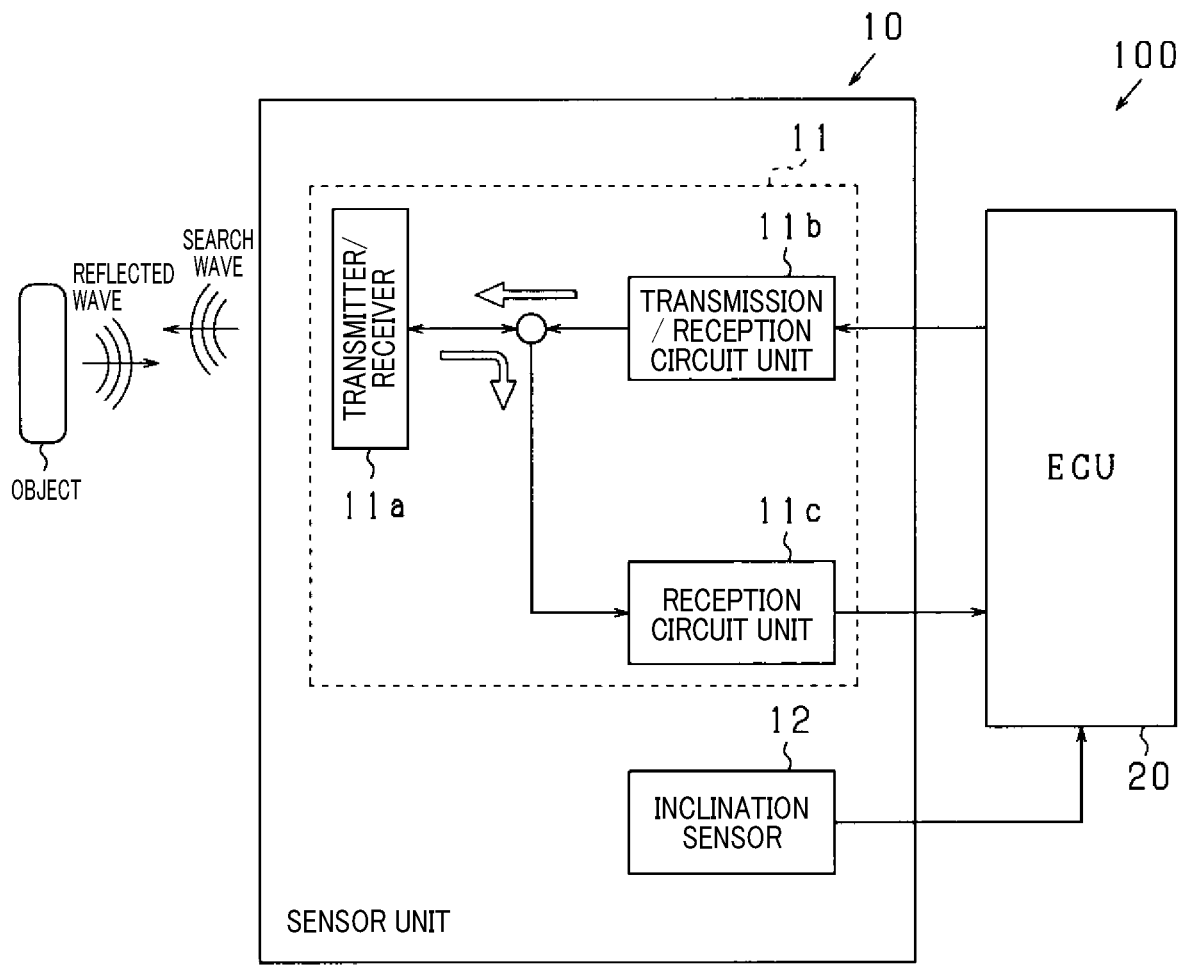
FIG. 1 is a schematic configuration diagram of an object detection apparatus according to the present embodiment.

In FIG. 1, an object detection apparatus 100 includes a sensor unit 10 and an ECU 20.

Among these, a plurality of the sensor units 10 are mounted to, for example, bumpers of the vehicle (not shown). The bumpers are provided at a front end portion and a rear end portion of the vehicle, and four sensor units 10 are arranged in a vehicle width direction at each of the bumpers.

Each of the plurality of sensor units 10 includes an ultrasonic sensor (corresponding to an object detection sensor) 11 and an inclination sensor 12.

The ultrasonic sensor 11 includes a transmitter/receiver 11a which transmits ultrasonic waves and receives reflected waves reflected from an object existing around the own vehicle, a transmission circuit unit 11b and a reception circuit unit 11c. The transmission circuit unit 11b is electrically connected to the transmitter/receiver 11a, and the transmitter/receiver 11a transmits ultrasonic waves in a predetermined direction by the transmission circuit unit 11b providing an electrical signal to the transmitter/receiver 11a for each predetermined control period. The reception circuit unit 11c is electrically connected to the transmitter/receiver 11a and detects reflected waves received by the transmitter/receiver 11a as an electrical signal.

The description of the inclination sensor 12 will be given later.

The ECU 20 is electrically connected to the transmission circuit unit 11b and the reception circuit unit 11c. The ECU 20 commands the transmission circuit unit 11b to output an electrical signal to the transmitter/receiver 11a for each predetermined control period. Meanwhile, the ECU 20 receives the electrical signal detected at the reception circuit unit 11c. A level of the signal is proportional to strength of the reflected waves, and the strength of the reflected waves changes according to a distance between an object existing around the own vehicle and the own vehicle. It is therefore possible to detect position information of the object existing around the own vehicle, based on the level of the electrical signal received from the reception circuit unit 11c. If the position information of the object is detected, a distance from the own vehicle to the object is calculated from the position information of the detected object and a position of the own vehicle.

When the above-described sensor unit 10 is mounted to the vehicle, as a result of a mounting angle of the sensor unit 10 being displaced, the detection direction of the ultrasonic sensor 11 may be inclined in the horizontal direction or in the vertical direction with respect to a predetermined direction, which is so-called axial misalignment, may occur at the ultrasonic sensor 11. If an object is detected by the ultrasonic sensor 11 which is axially misaligned, there is a possibility that an error may occur in the detection position of the object by an amount corresponding to the axial misalignment.

As a countermeasure, the sensor unit 10 including the ultrasonic sensor 11 further includes the inclination sensor 12 which detects an inclination angle, that is inclination with respect to the horizontal direction (horizontal plane). The horizontal direction in this case refers to a direction perpendicular to the gravity acting direction. As the inclination sensor 12, a well-known biaxial inclination sensor is used which detects inclination with respect to the horizontal direction by resolving the inclination into rotation angles respectively with respect to two axes (an X0 axis and a Y0 axis) which are orthogonal to each other. The rotation angle around the X0 axis detected by the inclination sensor 12 (roll angle θr) indicates an inclination angle in the vehicle width direction of a vehicle body, and the rotation angle around the Y0 axis (pitch angle θp) indicates an inclination angle in a longitudinal direction of the vehicle body. The biaxial inclination sensor may be implemented using a triaxial acceleration sensor or may be implemented with combination of a pendulum and a magnetic sensor.

Figure 2:
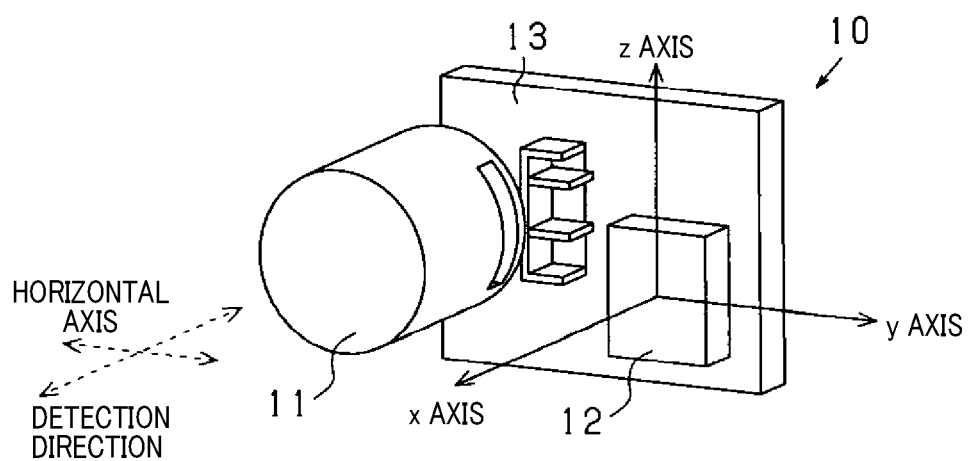
FIG. 2 is a schematic configuration diagram of a sensor unit.

As illustrated in FIG. 2, the sensor unit 10 is configured by the inclination sensor 12 being attached to the same substrate 13 as the substrate 13 on which the ultrasonic sensor 11 is attached. Therefore, when the sensor unit 10 is mounted to the vehicle, and in the case where the mounting angle of the sensor unit 10 is displaced, each of the ultrasonic sensor 11 and the inclination sensor 12 which are attached to the same substrate 13 inclines accordingly. Therefore, when the sensor unit 10 is mounted to the vehicle, the ECU 20 can determine whether axial misalignment has occurred at the ultrasonic sensor 11, based on the roll angle θr or the pitch angle θp detected by the inclination sensor 12.

However, there may occur some error in positional relationship between the ultrasonic sensor 11 and the inclination sensor 12 within the sensor unit 10. This is because when the inclination sensor 12 is attached to the substrate 13, the inclination sensor 12 may be attached at a position displaced from a position where the inclination sensor 12 should originally be attached. In this case, it is assumed that inclination of the inclination sensor 12 with respect to the detection direction of the ultrasonic sensor 11 is displaced from a value assumed in advance (design value). Therefore, if it is determined whether axial misalignment has occurred at the ultrasonic sensor 11 based on the inclination angle detected by the inclination sensor 12 when the sensor unit 10 is mounted to the vehicle, axial misalignment may not be determined with high accuracy, because displacement of inclination of the inclination sensor 12 with respect to the detection direction of the ultrasonic sensor 11 due to the error in the positional relationship between the ultrasonic sensor 11 and the inclination sensor 12 within the sensor unit 10 is not taken into account.

In view of the above, axial misalignment determination control performed by the ECU 20 includes a first inclination angle acquiring step, an abnormality determining step, a second inclination angle acquiring step and an axial misalignment determining step.

First, in the first inclination angle acquiring step, before the sensor unit 10 is mounted to the vehicle, the sensor unit 10 is disposed so that the detection direction (first predetermined direction) of the ultrasonic sensor 11 is aligned with a horizontal direction (second predetermined direction), and a roll angle θr and a pitch angle θp are detected by the inclination sensor 12 as a first inclination angle in that state. By this means, it is possible to obtain a degree of misalignment of a detection axis of the inclination sensor 12 with respect to the horizontal direction, based on a state where the detection direction of the ultrasonic sensor 11 is aligned with the horizontal direction. That is, it is possible to detect inclination of the inclination sensor 12 with respect to the detection direction of the ultrasonic sensor 11.

As described above, there may occur some error in positional relationship between the ultrasonic sensor 11 and the inclination sensor 12 within the sensor unit 10 due to the inclination sensor 12 being attached at a position displaced from a position where the inclination sensor 12 should be originally attached when the inclination sensor 12 is attached to the substrate 13. If the error in the positional relationship between the ultrasonic sensor 11 and the inclination sensor 12, which occurs when the inclination sensor 12 is attached to the substrate 13, is small, it is possible to adjust displacement of inclination of the inclination sensor 12 with respect to the detection direction of the ultrasonic sensor 11 due to the error in the positional relationship between the ultrasonic sensor 11 and the inclination sensor 12 within the sensor unit 10, when the sensor unit 10 is mounted to the vehicle. However, there is a limit in adjustable displacement, and if the displacement occurring when the inclination sensor 12 is attached to the substrate 13 is greater than an upper limit of the adjustable displacement, adjustment in which the displacement is taken into account may not be performed when the sensor unit 10 is mounted to the vehicle.

Therefore, the abnormality determining step is performed if the first inclination angle acquiring step is performed. In the abnormality determining step, it is determined whether the first inclination angle acquired from the inclination sensor 12 in the first inclination angle acquiring step is greater than a threshold. Specifically, it is determined whether the roll angle θr acquired in the first inclination angle acquiring step is greater than a first threshold. Further, it is determined whether the pitch angle θp acquired in the first inclination angle acquiring step is greater than a second threshold. Then, if an affirmative determination result is obtained in at least one of the both determinations, it is determined in the abnormality determining step that the positional relationship between the ultrasonic sensor 11 and the inclination sensor 12 in the sensor unit 10 is abnormal. By this means, it is possible to determine that the displacement of inclination of the inclination sensor 12 with respect to the detection direction of the ultrasonic sensor 11 due to the error in the positional relationship between the ultrasonic sensor 11 and the inclination sensor 12 within the sensor unit 10, which occurs when the inclination sensor 12 is attached to the substrate 13, is a displacement which is too large to be adjusted when the sensor unit 10 is mounted to the vehicle.

In the second inclination angle acquiring step, the sensor unit 10 for which the first inclination angle is acquired in the first inclination angle acquiring step is mounted to the vehicle, and a roll angle θr and a pitch angle θp detected by the inclination sensor 12 at that time are acquired as a second inclination angle. The roll angle θr or the pitch angle θp acquired in the second inclination angle acquiring step is inclination of the inclination sensor 12 with respect to the horizontal direction (horizontal plane) in a state where the sensor unit 10 is mounted to the vehicle.

Figure 3:
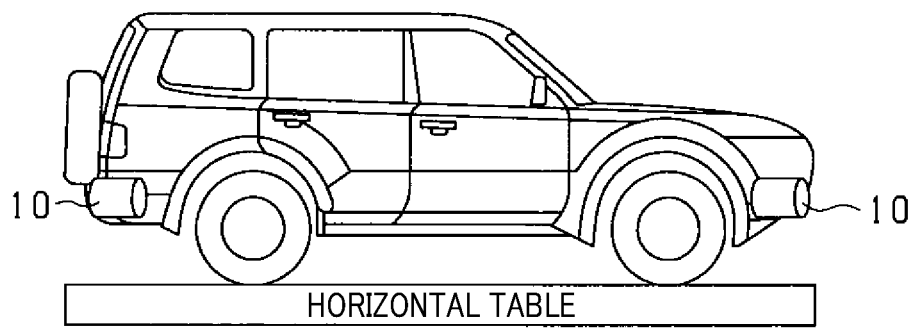
FIG. 3 is a diagram illustrating a state where a vehicle is mounted to a horizontal table.

If the vehicle is driven, there is a possibility that, in association with vibration of an engine, the sensor unit 10 mounted to the vehicle may also vibrate, and an error may occur in the second inclination angle detected by the inclination sensor 12 by being affected by the vibration. Further, if the vehicle is inclined and if the second inclination angle is detected by the inclination sensor 12, there is a possibility that an error may occur in the second inclination angle to be detected by an amount corresponding to inclination of the vehicle. Therefore, by the vehicle being stopped and placed on a horizontal table as illustrated in FIG. 3, the second inclination angle acquiring step is performed in a state where the vehicle is maintained in a horizontal state.

In the axial misalignment determining step, it is determined whether axial misalignment of the ultrasonic sensor 11 occurs based on the first inclination angle acquired in the first inclination angle acquiring step and the second inclination angle acquired in the second inclination angle acquiring step. Specifically, it is determined whether a first detection direction angle a which is a sum of the roll angle θr acquired in the first inclination angle acquiring step and the roll angle θr acquired in the second inclination angle acquiring step, falls within a first predetermined range. Further, it is determined whether a first detection direction angle b which is a sum of the pitch angle θp acquired in the first inclination angle acquiring step and the pitch angle θp acquired in the second inclination angle acquiring step, falls within a second predetermined range.

Both the first detection direction angles a and b are values obtained by adding the first inclination angle which is the inclination of the inclination sensor 12 with respect to the detection direction of the ultrasonic sensor 11, to the second inclination angle which is the inclination of the inclination sensor 12 with respect to the horizontal direction (horizontal plane) if the sensor unit 10 is mounted to the vehicle. Therefore, by determining whether the first detection direction angle a falls within the first predetermined range and whether the first detection direction angle b falls within the second predetermined range, it is possible to detect whether the detection direction of the ultrasonic sensor 11 is inclined with respect to the horizontal direction if the sensor unit 10 is mounted to the vehicle. In more detail, if it is determined that the first detection direction angle a does not fall within the first predetermined range, it is possible to detect that the detection direction of the ultrasonic sensor 11 is inclined with respect to the horizontal direction in the vehicle width direction of the vehicle body by a degree exceeding an allowable range. If it is determined that the first detection direction angle b does not fall within the second predetermined range, it is possible to detect that the detection direction of the ultrasonic sensor 11 is inclined with respect to the horizontal direction in the longitudinal direction of the vehicle body by a degree exceeding an allowable range.

Figure 4:
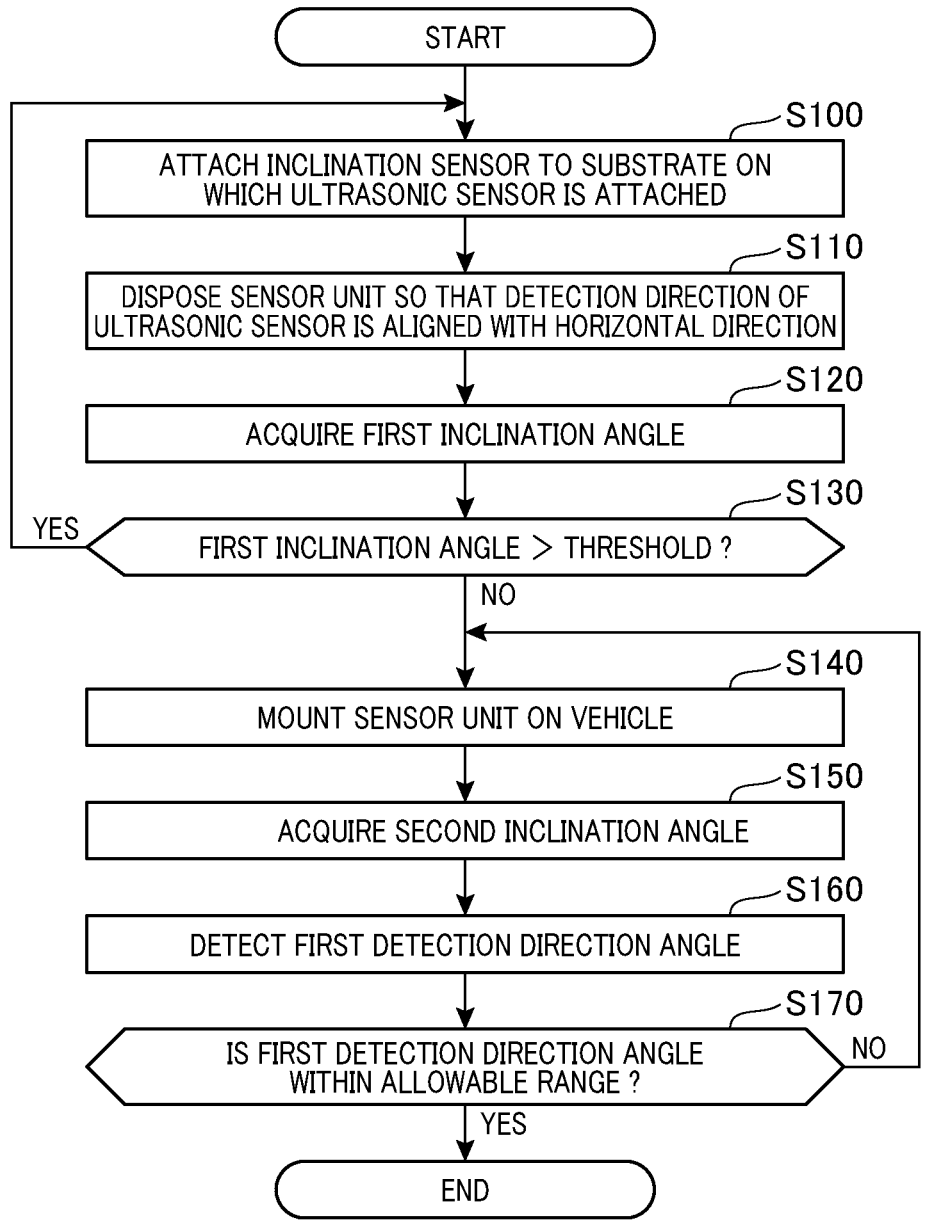
FIG. 4 is a flowchart illustrating procedure of axial misalignment determination of an ultrasonic sensor according to the present embodiment.

In the present embodiment, axial misalignment determination of the ultrasonic sensor 11 illustrated in FIG. 4 which will be described later is performed by the ECU 20. The axial misalignment determination of the ultrasonic sensor 11 illustrated in FIG. 4 is performed when the sensor unit 10 including the ultrasonic sensor 11 and the inclination sensor 12 is mounted to the vehicle. Attachment of the inclination sensor 12 (S100), disposition of the sensor unit (S110) and mounting of the sensor unit (S140) are performed by a worker, assembling machine, or the like.

First, in step S100, the sensor unit 10 is configured by the inclination sensor 12 being attached to the substrate 13 on which the ultrasonic sensor 11 is attached. In step S110, the sensor unit 10 is disposed so that the detection direction of the ultrasonic sensor 11 is aligned with the horizontal direction. In step S120, the roll angle θr and the pitch angle θp detected by the inclination sensor 12 provided at the sensor unit 10 are acquired as the first inclination angle.

In step S130, it is determined whether the roll angle θr acquired in step S120 is greater than the first threshold. Further, it is determined whether the pitch angle θp acquired in the first inclination angle acquiring step is greater than the second threshold. If an affirmative determination result is obtained in at least one of both determinations in step S130 (S130: Yes), control returns to step S100. Then, in S100, a position where the inclination sensor 12 is attached is corrected (adjusted). If negative determination results are obtained in the both determinations in step S130 (S130: No), the processing proceeds to step S140.

In step S140, the sensor unit 10 is mounted to the vehicle which is placed on the horizontal table and stopped. In step S150, the roll angle θr and the pitch angle θp detected by the inclination sensor 12 provided at the sensor unit 10 are acquired as the second inclination angle. In step S160, the first detection direction angle a, which is a sum of the roll angle θr acquired by the inclination sensor 12 as the first inclination angle in step S120, and the roll angle θr acquired by the inclination sensor 12 as the second inclination angle in step S150, is calculated. In a similar manner, the first detection direction angle b, which is a sum of the pitch angle θp acquired by the inclination sensor 12 as the first inclination angle in step S120, and the pitch angle θp acquired by the inclination sensor 12 as the second inclination angle in step S150, is calculated.

In step S170, it is determined whether the first detection direction angle a calculated in step S150 falls within the first predetermined range. Further, it is determined whether the first detection direction angle b calculated in step S150 falls within the second predetermined range. If a negative determination result is obtained in at least one of the both determination (S170: No), control returns to step S140. Then, in S140, a position where the sensor unit 10 is attached is corrected (adjusted). if an affirmative determination results are obtained in the both determination (S170: Yes), the present control is terminated.

With the above-described configuration, the present embodiment provides the following effects.

It is possible to obtain inclination of the inclination sensor 12 with respect to the detection direction of the ultrasonic sensor 11 from the roll angle θr and the pitch angle θp acquired as the first inclination angle. Further, from the roll angle θr and the pitch angle θp acquired as the second inclination angle, it is possible to obtain inclination of the inclination sensor 12 with respect to the horizontal direction if the sensor unit 10 is mounted to the vehicle. Therefore, by determining whether the first detection direction angle a, which is a sum of the roll angle θr as the first inclination angle and the roll angle θr as the second inclination angle, falls within the first predetermined range, it is possible to detect axial misalignment of the ultrasonic sensor 11 with respect to the horizontal direction in the vehicle width direction of the vehicle body. Further, by determining whether the first detection direction angle b, which is a sum of the pitch angle θp as the first inclination angle and the pitch angle θp as the second inclination angle, falls within the second predetermined range, it is possible to detect axial misalignment of the ultrasonic sensor 11 with respect to the horizontal direction in the longitudinal direction of the vehicle body.

Because the second inclination angle is acquired in the second inclination angle acquiring step in a state where the vehicle is stopped, it is possible to prevent an error due to vibration of the vehicle from occurring in the second inclination angle to be detected. Thus, determination with higher accuracy can be performed.

In the second inclination angle acquiring step, the second inclination angle is acquired from the inclination sensor 12 on condition that the vehicle maintains a horizontal state. Accordingly, it is possible to prevent an error from occurring in the second inclination angle by an amount corresponding to inclination of the vehicle.

The following modifications may be made to the above embodiment.

In the above-described embodiment, the sensor unit 10 includes the ultrasonic sensor 11 as a sensor which detects an object. Concerning this point, if the sensor can detect an object, the sensor is not limited to the ultrasonic sensor 11, and may be a laser radar, a millimeter wave radar or a camera.

In the above-described embodiment, the ultrasonic sensor 11 and the inclination sensor 12 are attached to the same substrate 13. Concerning this point, the ultrasonic sensor 11 and the inclination sensor 12 do not necessarily have to be attached to the substrate 13, and may be attached to a chassis of the sensor unit 10.

In the above-described embodiment, the second inclination angle acquiring step is performed in a state where the vehicle is stopped. Concerning this point, the second inclination angle acquiring step may be performed in a state where the vehicle is driven.

In the above-described embodiment, the abnormality determining step is performed when the first inclination angle is acquired from the inclination sensor 12 in the first inclination angle acquiring step. Concerning this point, the abnormality determining step does not necessarily have to be performed.

In the above-described embodiment, the roll angle θr and the pitch angle θp are acquired from the inclination sensor 12 in both the first inclination angle acquiring step and the second inclination angle acquiring step. Concerning this point, it is not always necessary to acquire both the roll angle θr and the pitch angle θp, and a configuration may be performed in which one inclination angle out of the roll angle θr and the pitch angle θp is acquired. That is, if a configuration is employed where only the roll angle θr is acquired in the first inclination angle acquiring step and the second inclination angle acquiring step, it is determined in the axial misalignment determining step only as to whether the first detection direction angle a, which is a sum of the roll angle θr acquired in the first inclination angle acquiring step and the roll angle θr acquired in the second inclination angle acquiring step, falls within the first predetermined range.

The inclination sensor 12 is not limited to a sensor which detects an inclination angle as inclination with respect to the horizontal direction (horizontal plane), and may be a sensor which detects an inclination angle as inclination with respect to an inclination direction (inclined surface) inclined with respect to the horizontal direction (horizontal plane). In this case, in the first inclination angle acquiring step, before the sensor unit 10 is mounted to the vehicle, the sensor unit 10 is disposed so that the detection direction (first predetermined direction) of the ultrasonic sensor 11 is aligned with the inclination direction (second predetermined direction), and the first inclination angle is detected by the inclination sensor 12 in that state.

Let us assume a case where a plurality of sensor units 10 have already been mounted to the vehicle. In this case, if the inclination sensor 12 fails, which is provided at one sensor unit 10 among the plurality of sensor units 10 mounted to the vehicle, it is necessary to replace the sensor unit 10 including the inclination sensor 12 which has failed. In replacement of the sensor unit 10 which is to be replaced, the sensor unit 10 is removed from the vehicle, and the sensor unit 10 for which the first inclination angle has already been measured is mounted to the vehicle. When the sensor unit 10 is mounted to the vehicle, there is a possibility that a mounting angle of the sensor unit 10 may be displaced. Therefore, it is preferable to determine axial misalignment of the object detection sensor in the axial misalignment determining step when the sensor unit 10 is replaced.

Figure 5:
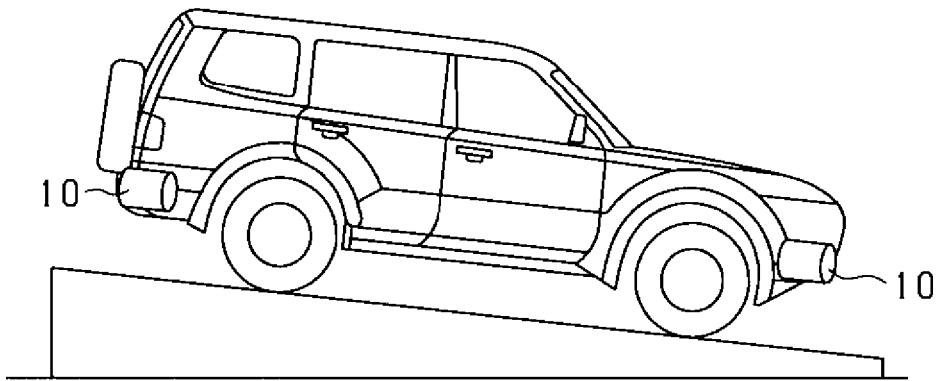
FIG. 5 is a diagram illustrating that the vehicle is inclined in a longitudinal direction with respect to the horizontal direction.

By the way, replacement of the sensor unit 10 is not necessarily performed at a factory from which the vehicle has been shipped, and a case can be assumed where the sensor unit 10 is replaced at a factory where there is not horizontal table. Therefore, as illustrated in FIG. 5, replacement of the sensor unit 10 may be performed in a state where the vehicle is inclined, depending on inclination of a road surface. In this case, because an error occurs in the second inclination angle detected by the inclination sensor 12 by an amount corresponding to the inclination angle of the vehicle (in the case of FIG. 5, an error occurs in the pitch angle $\theta p$ detected as the second inclination angle), even if axial misalignment does not occur at the ultrasonic sensor 11, it may be erroneously determined that axial misalignment has occurred at the ultrasonic sensor 11 when axial misalignment of the ultrasonic sensor 11 is determined.

In view of the above, if the sensor unit 10 which has already been mounted to the vehicle is replaced, the following axial misalignment determination control is performed. The present axial misalignment determination control includes an inclination correction angle calculating step, a third inclination angle acquiring step, and an axial misalignment determining step.

First, in the inclination correction angle calculating step, before the sensor unit 10 is replaced, an inclination correction angle $\theta v$ of the vehicle is calculated. In the sensor unit 10 (second sensor unit) other than the sensor unit 10 (first sensor unit) to be replaced, the inclination correction angle $\theta v$ of the vehicle can be determined by calculating a difference ($\theta 20-\theta 21$) between a second inclination angle $\theta 20$ acquired in the second inclination angle acquiring step when the sensor unit 10 (second sensor unit) is mounted to the vehicle for the first time, and a current second inclination angle $\theta 21$ acquired from the inclination sensor 12. More specifically, in the sensor unit 10 other than the sensor unit 10 to be replaced, a correction pitch angle $\theta vp$ of the vehicle is calculated from a difference ($\theta p20-\theta p21$) between a pitch angle $\theta p20$ acquired in the second inclination angle acquiring step when the sensor unit 10 is mounted to the vehicle for the first time, and a current pitch angle $\theta p21$ acquired from the inclination sensor 12. Further, in the sensor unit 10 other than the sensor unit 10 to be replaced, a correction roll angle $\theta vr$ of the vehicle is calculated from a difference ($\theta p30-\theta p31$) between a roll angle $\theta r30$ acquired in the second inclination angle acquiring step when the sensor unit 10 is mounted to the vehicle for the first time, and a current roll angle $\theta r31$ acquired from the inclination sensor 12.

Then, in the third inclination angle acquiring step, the sensor unit 10 (third sensor unit) for which the first inclination angle has been measured is mounted to the vehicle in place of the sensor unit 10 to be replaced, and a roll angle $\theta r$ and a pitch angle $\theta p$ detected by the inclination sensor 12 provided at the replaced sensor unit 10 are acquired from the inclination sensor 12 as a third inclination angle.

In the axial misalignment determining step, it is determined for the replaced sensor unit 10, whether axial misalignment of the ultrasonic sensor 11 occurs, based on the inclination correction angle $\theta v$ of the vehicle calculated in the inclination correction angle calculating step, the measured first inclination angle, and the third inclination angle acquired in the third inclination angle acquiring step. Specifically, it is determined whether a value obtained by adding the correction roll angle $\theta vr$ of the vehicle to a second detection direction angle c, which is a sum of the roll angle $\theta r$ measured as the first inclination angle and the roll angle $\theta r$ acquired in the third inclination angle acquiring step, falls within the first predetermined range. Further, it is determined whether a value obtained by adding the correction pitch angle $\theta vp$ of the vehicle to a second detection direction angle d, which is a sum of the pitch angle $\theta p$ measured as the first inclination angle and the pitch angle $\theta p$ acquired in the third inclination angle acquiring step, falls within the second predetermined range. Then, if it is determined that the value obtained by adding the correction roll angle $\theta vr$ of the vehicle to the second detection direction angle c does not fall within the first predetermined range, or the value obtained by adding the correction pitch angle $\theta vp$ of the vehicle to the second detection direction angle d does not fall within the second predetermined range, it is determined that axial misalignment has occurred at the ultrasonic sensor 11.

Figure 6:
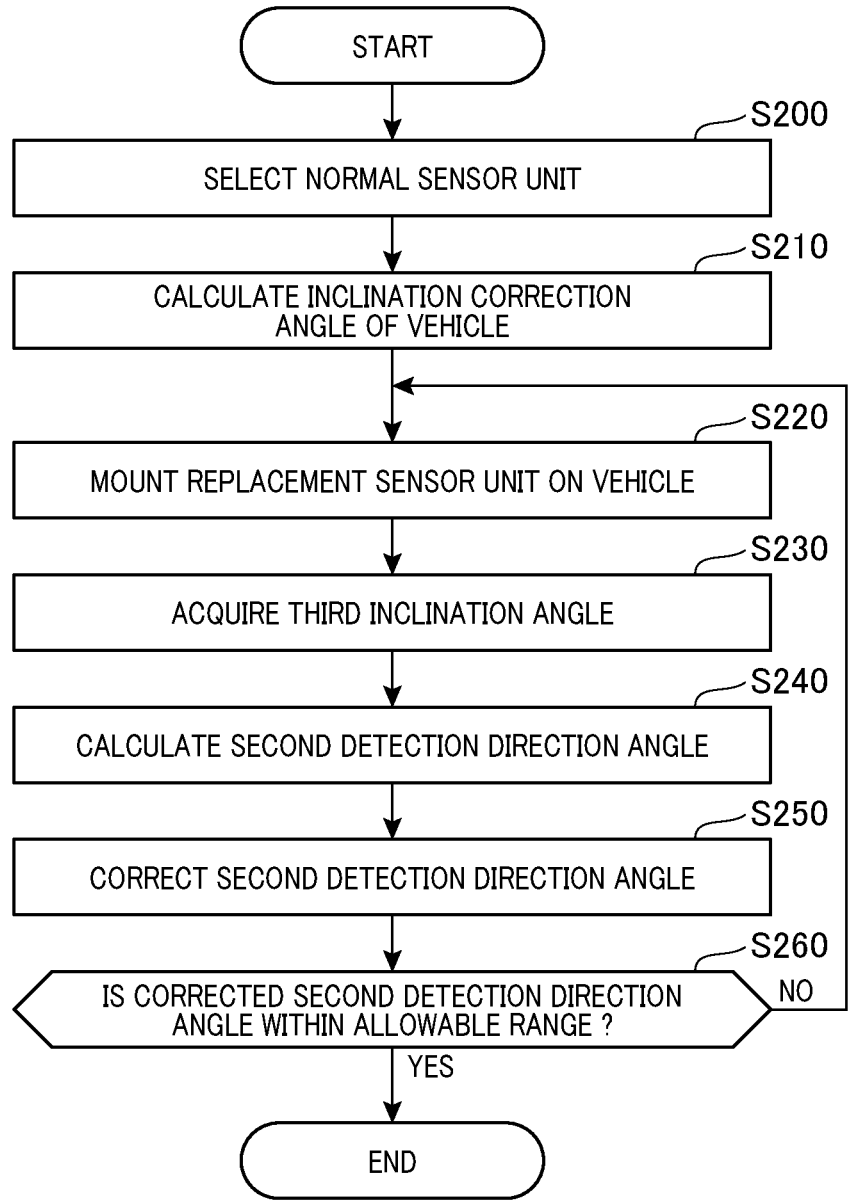
FIG. 6 is a flowchart illustrating procedure of axial misalignment determination of an ultrasonic sensor according to an example.

In the present embodiment, axial misalignment determination of the ultrasonic sensor 11 illustrated in FIG. 6 and will be described later is performed by the ECU 20. The axial misalignment determination of the ultrasonic sensor 11 as illustrated in FIG. 6 is performed at a vehicle on which a plurality of sensor units 10 have been mounted, when one out of the plurality of sensor units 10 is replaced. The axial misalignment determination is performed selection of a normal sensor unit 10 (S200) as first step, and replacement of the sensor unit 10 (S220) is performed by a worker, assembling machine, or the like.

First, in step S200, a normal sensor unit 10 which is not to be replaced is selected. Then, in step S210, the correction roll angle $\theta vr$ of the vehicle is calculated from a difference ($\theta p20-\theta p21$) between the roll angle $\theta r20$ as the second inclination angle acquired in the second inclination angle acquiring step when the sensor unit 10 is mounted for the first time, and the current roll angle $\theta r21$ detected by the sensor unit 10 selected in step S200. Further, the correction pitch angle $\theta vp$ of the vehicle is calculated from a difference ($\theta p30-\theta p31$) between the pitch angle $\theta p30$ as the second inclination angle acquired in the second inclination angle acquiring step when the sensor unit 10 is mounted for the first time, and the current pitch angle $\theta p31$ detected by the sensor unit 10 selected in step S200.

In step S220, the sensor unit 10 for which the first inclination angle has been measured is mounted to the vehicle in place of the sensor unit 10 to be replaced. In step S230, the roll angle $\theta r$ and the pitch angle $\theta p$ detected by the inclination sensor 12 provided at the replaced sensor unit 10 are acquired from the inclination sensor 12 as the third inclination angle. In step S240, the second detection direction angle c, which is a sum of the roll angle θr measured as the first inclination angle, and the roll angle θr acquired in step S230, is calculated. Further, the second detection direction angle d, which is a sum of the pitch angle θp measured as the first inclination angle, and the pitch angle θp acquired in the third inclination angle acquiring step, is calculated. In step S250, the second detection direction angle c is corrected by adding the correction roll angle θvr of the vehicle calculated in step S210 to the second detection direction angle c calculated in step S240. Further, the correction pitch angle θvp of the vehicle calculated in step S210 is added to the second detection direction angle d calculated in step S240 to correct the second detection direction angle d.

In step S260, it is determined whether the second detection direction angle c corrected in step S250 falls within the first predetermined range. Further, it is determined whether the second detection direction angle d corrected in step S250 falls within the second predetermined range. If a negative determination result is obtained in at least one of the both determination (S260: No), control returns to step S220. Then, in S220, a position where the sensor unit 10 is attached is corrected (adjusted). If affirmative determination results are obtained in the both determination (S260: Yes), the present control is terminated.

By performing the axial misalignment determination according to the present example, if the sensor unit 10 is replaced in a situation where the vehicle is inclined according to inclination of a road surface, degradation of accuracy for the axial misalignment determination of the ultrasonic sensor 11 can be suppressed.

The present disclosure has been described by way of examples; however, the present disclosure should not be construed as being limited to such examples or structures. The scope of the present disclosure should encompass various modifications or equivalents. In addition, various combinations or modes, and even other combinations or modes including one or more elements or one or less elements should fall within the scope and spirits of the present disclosure.

The invention claimed is:

1. An axial misalignment determination method for determining axial misalignment of an object detection sensor using a sensor unit including the object detection sensor in which a first predetermined direction is set as a detection direction of an object, and an inclination sensor which detects an inclination angle as inclination with respect to a second predetermined direction, being mounted to a vehicle, the axial misalignment determination method comprising:
   disposing the sensor unit so that the first predetermined direction is aligned with the second predetermined direction before the sensor unit is mounted to the vehicle, and acquiring a first inclination from the inclination sensor, the first inclination angle being the inclination angle detected by the inclination sensor;
   in response to determining that the first inclination angle is less than or equal to a threshold before the sensor unit is mounted, mounting the sensor unit on the vehicle and acquiring a second inclination angle from the inclination sensor, the second inclination angle being the inclination angle detected by the inclination sensor after the inclination sensor is mounted on the vehicle; and
   determining whether axial misalignment has occurred at the object detection sensor, based on the first inclination angle and the second inclination angle.

2. The axial misalignment determination method of the object detection sensor according to claim 1,
   wherein, in determining whether axial misalignment has occurred at the object detection sensor, for a state in which a first detection direction angle, which is a sum of the first inclination angle and the second inclination angle, does not fall within a predetermined range, it is determined that axial misalignment has occurred at the object detection sensor.

3. The axial misalignment determination method of the object detection sensor according to claim 1, comprising:
   determining that a positional relationship between the object detection sensor and the inclination sensor at the sensor unit is abnormal, for a state in which the first inclination angle is greater than the threshold, before the sensor unit is mounted to the vehicle.

4. The axial misalignment determination method of the object detection sensor according to claim 1, which is performed if the sensor unit is replaced, the axial misalignment determination method comprising:
   calculating a difference between the second inclination angle when a second sensor unit is mounted to the vehicle for a first time and a current second inclination angle acquired from the inclination sensor at the second sensor unit other than a first sensor unit to be replaced, as an inclination correction angle of the vehicle; and
   mounting a third sensor unit for which the first inclination angle has been measured on the vehicle in place of the first sensor unit to be replaced and acquiring a third inclination angle from the inclination sensor, the third inclination angle being the inclination angle detected by the inclination sensor provided at the replaced sensor unit,
   wherein, in determining whether axial misalignment has occurred at the object detection sensor, for a state in which a value obtained by adding the inclination correction angle to a second detection direction angle, which is a sum of the measured first inclination angle and the third inclination angle, does not fall within a predetermined range, it is determined that axial misalignment has occurred at the object detection sensor.

5. The axial misalignment determination method of the object detection sensor according claim 1,
   wherein, in acquiring the second inclination angle from the inclination sensor, the second inclination angle is acquired from the inclination sensor for a state in which the vehicle is stopped.

6. The axial misalignment determination method of the object detection sensor according to claim 1,
   wherein, in acquiring the second inclination angle from the inclination sensor, the second inclination angle is acquired from the inclination sensor for a state in which the vehicle maintains a horizontal state.

7. An axial misalignment determination method for determining axial misalignment of an object detection sensor using a sensor unit including the object detection sensor in which a first predetermined direction is set as a detection direction of an object, and an inclination sensor which detects an inclination angle as inclination with respect to a second predetermined direction, being mounted to a vehicle, the axial misalignment determination method comprising:
   disposing the sensor unit so that the first predetermined direction is aligned with the second predetermined direction before the sensor unit is mounted to the vehicle, and acquiring a first inclination angle as the inclination angle detected by the inclination sensor from the inclination sensor;

mounting the sensor unit on the vehicle and acquiring a second inclination angle, the second inclination angle being the inclination angle detected by the inclination sensor after the inclination sensor is mounted on the vehicle;

determining whether axial misalignment has occurred at the object detection sensor, based on the first inclination angle and the acquired second inclination angle;

calculating a difference between the second inclination angle when a second sensor unit is mounted to the vehicle for a first time and a current second inclination angle acquired from the inclination sensor at the second sensor unit other than a first sensor unit to be replaced, as an inclination correction angle of the vehicle; and mounting a third sensor unit for which the first inclination angle has been measured on the vehicle in place of the first sensor unit to be replaced and acquiring a third inclination angle from the inclination sensor, the third inclination angle being the inclination angle detected by the inclination sensor provided at the replaced sensor unit, wherein, in determining whether axial misalignment has occurred at the object detection sensor, for a state in which a value obtained by adding the inclination correction angle to a second detection direction angle, which is a sum of the measured first inclination angle and the third inclination angle, does not fall within a predetermined range, it is determined that axial misalignment has occurred at the object detection sensor.

* * * * *